Aug. 7, 1956  E. S. HALSEY  2,757,881
HAND LINE DRUM
Filed Nov. 26, 1954  2 Sheets-Sheet 1
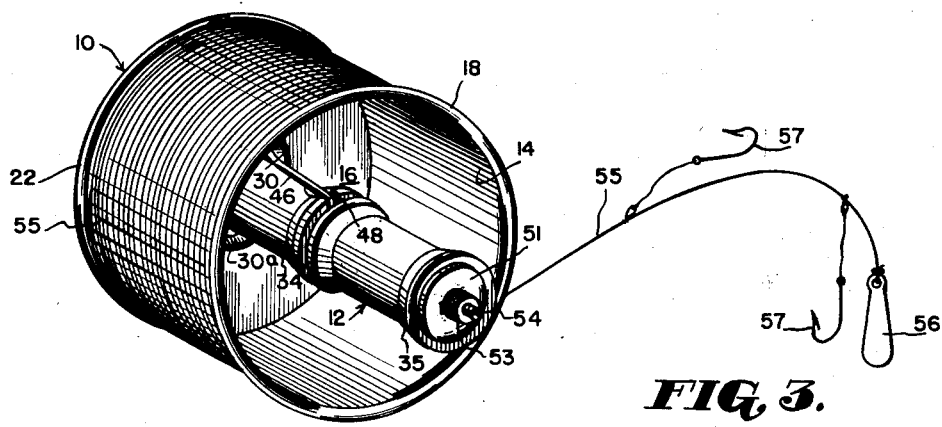
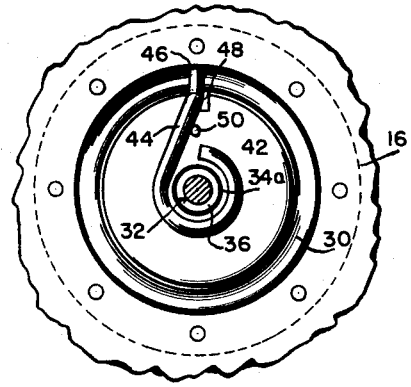
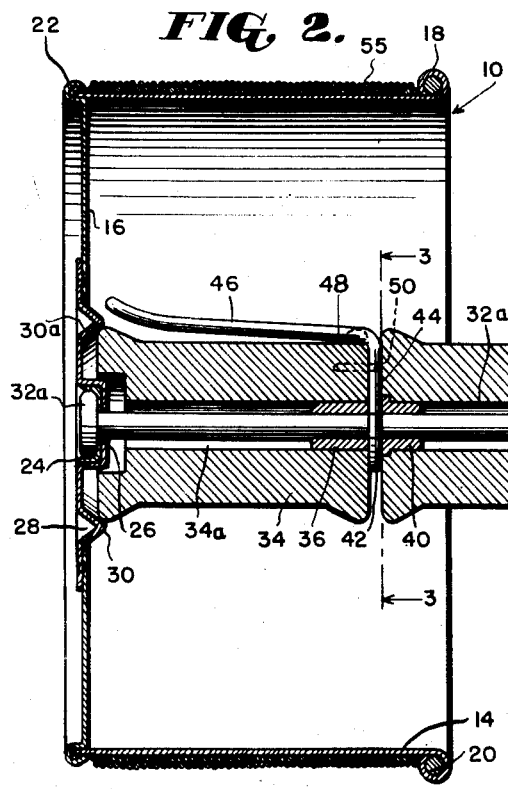
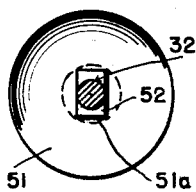
INVENTOR
*Edward S. Halsey*
BY *Wilfred E. Lawson*
ATTORNEY Aug. 7, 1956
E. S. HALSEY
2,757,881
HAND LINE DRUM
Filed Nov. 26, 1954
2 Sheets-Sheet 2
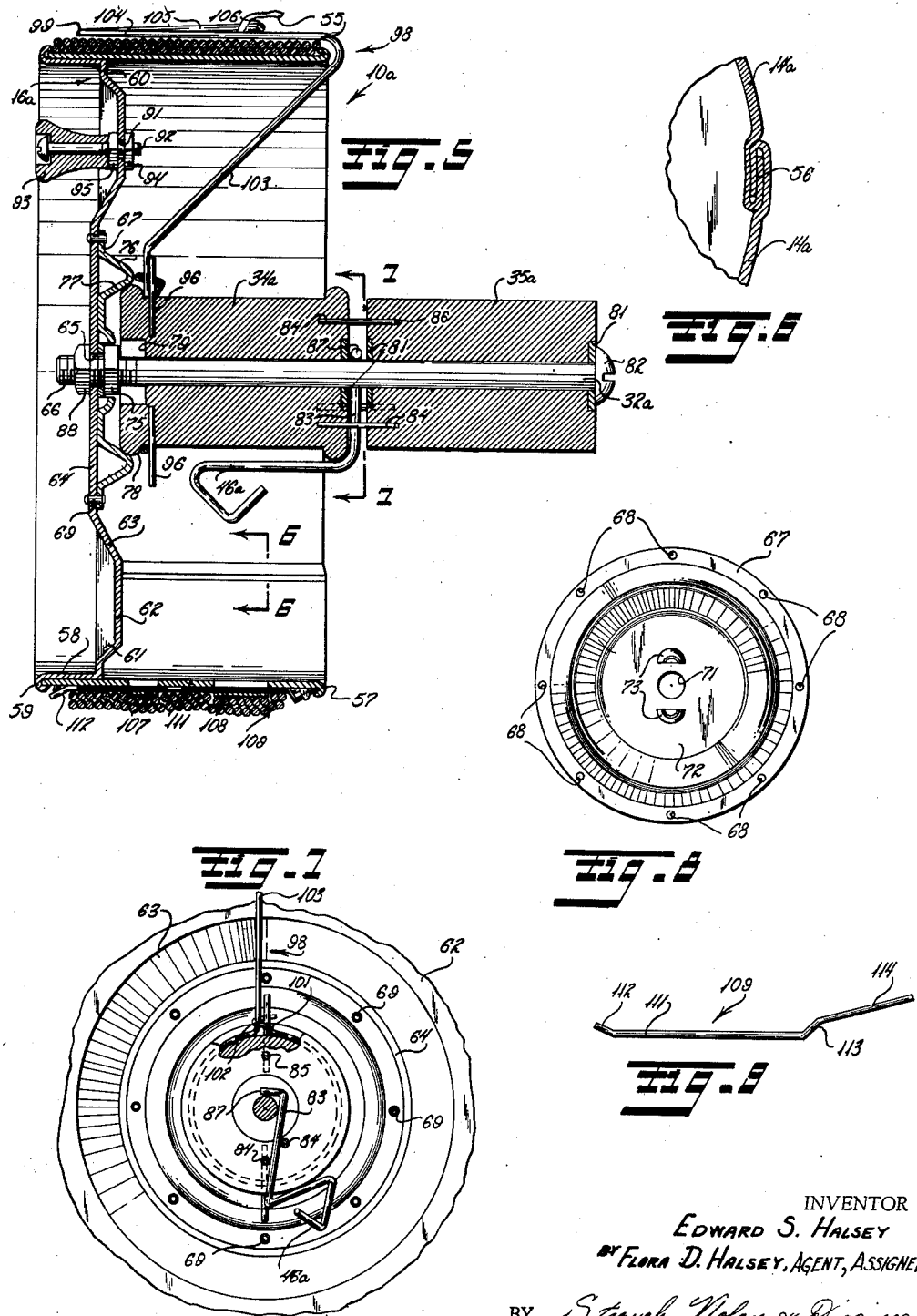
INVENTOR
EDWARD S. HALSEY
BY FLORA D. HALSEY, AGENT, ASSIGNEE
BY Strauch, Nolan & Diggins
ATTORNEYS

United States Patent Office 2,757,881
Patented Aug. 7, 1956

2,757,881
HAND LINE DRUM

Edward S. Halsey, late of Arlington, Va.; Flora D. Halsey, administratrix of the estate of said Edward S. Halsey, deceased Application November 26, 1954, Serial No. 481,119

10 Claims. (Cl. 242—96)

This application is a continuation-in-part of application No. 305,483, filed August 20, 1952, and now abandoned.

The present invention relates to hand line drums and more particularly to a hand line drum adapted for reeling in and paying out lines, such as fishing lines, kite string and other like light lines.

Devices of this general character have been previously proposed in the art and while some of them have proved satisfactory in end result they have involved complicated and extremely expensive constructions necessitating a selling price well above the practical limit.

It, accordingly, is a primary object of the present invention to provide a hand line drum that is simple and inexpensive to produce yet which embodies the de luxe features of a braking mechanism to control the rate at which the line is payed out, a handle for reeling in the line and a line guide adapted to maintain the line in proper lateral relation to the drum during the reeling operation.

Still another object of the present invention appertains to a hand fishing line carrier generally and more particularly to a simplified form of line reel of drum type for use in drop line or hand casting fishing and like procedures wherein the line, when dropped or cast, will feed endwise from the drum in a manner to obviate backlashing.

Another object of the invention is to provide a hand line drum closed at one end and having a handle connected with said end and extending axially through the drum and beyond the opposite and open end, the drum being rotatably supported upon the handle but arranged to permit the line to be drawn off endwise from the periphery of the drum as may be necessary to feed line to a hooked fish.

Still another object of the invention is to provide a hand line carrying drum rotatably supported upon a handle, connected therewith in the manner stated, with means in the form of a conveniently located thumb or finger actuated brake for checking or stopping the rotation of the drum on the supporting handle as may be desired.

A further and more specific object of the invention is to provide a hand line drum having a head wall closing one end and having its other end open with a shaft rigidly secured at one end to the center of the head wall and extending axially through the drum and beyond the open end thereof and a handle rotatably supported on the shaft and comprising a pair of spaced spools with finger operated brake means interposed between the adjacent ends of the spools whereby the inner spool may be forced toward and into frictional contact with the head wall and the outer spool toward and into end contact with a disk mounted on the opposite end of the shaft to control the rotation of the drum and shaft with respect to the spools which constitute the handhold of the device.

Still another object of the present invention resides in providing a hand line drum having an annular wall formed from a length of thin sheet metal, a head wall composed of angularly related reinforcing areas terminating in a peripheral flange the free end of which is rolled backwardly upon itself and crimped around one edge of the annular wall to secure the two walls together and a central opening adapted to fixedly receive a drum shaft for rotatable association with a handhold structure.

Still another object of the present invention is to provide a drum according to the previous claim with a braking disk having a peripheral radially extending mounting flange adapted to be secured to the inner face of the head wall, a centrally located radially extending area connected to said flange by an annular inwardly depressed rib section adapted to impart axial stability to the disk and head wall and an inwardly inclined braking surface.

A further object of the present invention is to provide the braking element of the previous object with struck-out inwardly directed protuberant formations diametrically opposed one from the other and spaced apart to closely but freely receive a nut threaded on the drum shaft and cooperating with the drum shaft and a second nut threaded on the drum shaft to clamp the brake element and drum head wall to said shaft for rotation therewith.

Other objects and advantages of the invention will become apparent as the description proceeds in conjunction with the appended claims and attached drawings wherein:

Figure 1 is a view in perspective of one form of hand line drum made in accordance with the present invention, looking at the back open end of the drum;

Figure 2 is a sectional view taken along a central longitudinal plane and on an enlarged scale of the structure illustrated in Figure 1;

Figure 3 is a transverse sectional view taken substantially on line 3—3 of Figure 2;

Figure 4 is a transverse sectional view taken substantially on line 4—4 of Figure 2;

Figure 5 is a sectional view similar to Figure 2 through a second preferred form of hand line drum made in accordance with the present invention;

Figure 6 is a fragmental sectional view taken on line 6—6 of Figure 5;

Figure 7 is a fragmental sectional view taken on line 7—7 of Figure 5 looking in the direction of the arrows.

Figure 8 is a detailed elevational view of the brake element of the preferred form of the invention; and Figure 9 is a detailed elevational view of the line attachment clip of Figure 5.

With continued reference to the drawings wherein like reference numerals are used throughout to indicate the same parts, the numeral 10 designates the drum body generally while numeral 12 designates the handle structure for rotatably supporting the drum body in the hand of a user.

The drum body 10 may be made of any suitable material, but a light weight non-corrosive metal is preferred. As an example, use may be made in making up the device, of a standard metal can such as coffee is sold in one pound quantities whereby, after the removal of the lid or top there remains a structure similar to what is shown in Figure 2, with slight modifications.

In the drum structure there is provided the relatively wide circular wall 14 which is connected at one edge with a closing head wall 16.

For the purpose of stiffening the edge of the circular wall 14 remote from the end wall or head 16, the free edge of the wall 14 at the open end of the drum may be rolled or beaded, as illustrated at 18 over a suitable stiffening wire 20 so as to form a bead around the open end of the drum as shown. This beaded edge in cooperation with the bead 22 at the opposite or forward end of the drum formed by the interlocking of the edges of the circular wall 14 and head wall 16 provides a means for preventing the wound line from slipping from the surface of the drum wall 14.

The central portion of the head wall 16 is formed with a central opening adapted to receive an annular reinforcing disk depressed at its center to form a recess 24 the bottom of which is provided with an aperture 26. This reinforcing disk is secured to head wall 16 in any suitable manner such as rivets as shown clearly in Figure 3.

The reinforcing disk is also annularly depressed inwardly along an area radially outwardly of aperture 26 as indicated at 28 (Figure 2) to form an inwardly projecting annular rib 30 having a sloping inner wall surface 30a which forms a friction face for a purpose hereinafter set forth.

The numeral 32 generally designates a headed shaft or axle the head 32a of which seats in recess 24 where it is firmly secured by welding or in any other suitable manner.

The axle or shaft 32, as clearly seen from Figure 2, extends through the aperture 26 at the center of the drum head wall to a substantial distance beyond the open or rear end of the drum and is screw threaded as indicated at 33. Mounted in end to end relation upon shaft 32 are inner and outer handle spools respectively designated by numerals 34 and 35.

The inner spool 34 has a longitudinal center bore therethrough which, at its outer end, receives a bearing sleeve 36 and at its opposite or inner end is recessed as indicated at 38 to freely receive the central portion or reinforcing disk which forms the recess 24. As a consequence, inner spool 34 when slid axially along shaft 32 on its bearing sleeve 36 may enter the recess provided between annular rib 30 and recess 24 to frictionally engage the sloping inner wall face 30a. The overall diameter of spool 34 at its inner end is slightly less than the maximum inside diameter of the rib wall 30a so that the inner end of the spool will enter the rib in the manner stated.

The outer spool has bearing sleeves 40 frictionally secured in the opposite ends of the axial bore 32a therein so that the spool may revolve smoothly on the axle 32 and support the axle and drum for smooth relative rotation with respect to spools 34 and 35. Interposed between the adjacent ends of the spools 34 and 35 is a brake operating member in the form of an open ring 42 of stiff wire which freely encircles the shaft or axle 32 and has one end extended tangentially as indicated at 44 to the rim of the spool. At the rim of the spool, the rigid wire brake operating member is bent to provide an elongated actuating arm 46 which lies in and extends through a slot 48 formed in the rim of the spool 34. As clearly seen in Figure 2 actuating arm 46 extends toward and terminates adjacent head wall 16.

Fixed in the outer end face of the spool 34 between the shaft passage 34a and slot 48 is a short longitudinally directed fulcrum pin 50 against which the extension 44 of the brake operating member bears.

The outer end of the axle shaft 32 receives a concave or dished friction disk 51, the concave face of which opposes the outer end of the spool 35. This disk is provided with a central rectangular opening 51a (Figure 4) which receives the correspondingly formed key or tongue 52 carried or formed integrally upon a nut 53 threaded upon the outer end of the axle shaft 32. It will be seen that when the nut 53 is threaded down on the shaft with the tongue 52 engaged in the slot 51a, the disk 51 will turn with the nut until the edge of the disk comes into engagement with the adjacent end face of the spool 35. Further turning of the nut 53, after engagement of the disk with the end face of spool 35, causes axial movement of spools 34 and 35 along shaft 32 to bring the spools into suitable contact with the interposed brake ring 42 and into proper axial position for the inner end of spool 34 to lightly engage or just clear the friction face 30a. When a desired position is obtained the nut 53 is locked by threading into the outer end thereof the short locking screw 54 which is forced tightly against the outer end of the axle 32 as illustrated.

In the use of the present device the line or cord 55 is wound around the drum between the beaded edges 18 and 22. The user of the device holds the two spools 34 and 35 of the handle in the left hand with the thumb or a finger positioned adjacent arm 46 of the brake operating element. The casting of the end of the line, carrying a suitable weight 56 and hooks 57 or other elements to be cast, is effected in the customary manner of casting a hand line, that is, by twirling the weighted end of the line and releasing it at the proper moment to cause the weight and hooks to fly outwardly in the desired direction or by permitting the pull of the weight and hooks or other object to draw the line from the drum. When the line is thus released the drum will be held with the rotary axis of the axle 32 pointing forwardly in the direction in which the line has been cast so that the line can strip freely off the drum across the front edge bead 22.

When the desired amount of line has been payed out the drum is turned at right angles to its casting position so that the line tightens around the annular wall 14 and causes relative rotation of the drum and axle 32 with respect to handle 35 so that further paying out of the line can be controlled as to its rate of movement through operation of handle 46 and braking of the drum by pressing of spool 34 against friction wall 30a. When used for fishing and upon hooking of a fish, the user grasps or presses his right hand against the drum so as to revolve it in the opposite direction to rewind the line on the drum and pull the fish in. If the fish runs with the line so that some of the line must be again payed out, the drum is permitted to rotate with the axle turning in the bearings 36 and 40 of the spools. During the running off of the line, the fisherman can apply the desired amount of drag or back pull by forcing the brake arm 46 to one side of the spool 34. This will cause the portion 44 to bear against the pin 50 and rotate thereon slightly so as to twist the annular ring portion 42 in a manner to force spool 34 axially against the brake surface 30a of rib 30. At the same time, the outer spool 35 will be forced more tightly against the disk 51 and consequently the rotation of the drum and axle will be retarded.

The same general operation takes place if the hand line drum is used for controlling other objects, such as kites or the like.

After the line or cord 55 has been sufficiently wound in to bring the weight or sinker 56 and hooks 57 or other object close to the drum body 10 as illustrated in Figure 1, the drum body 10 may be given a quarter turn to up end the spools 34 and 35 or bring the open face of the drum body uppermost. In this position of the drum, the outer end or terminal portion of the line 55 together with the weight or sinker 56 and the hooks may be readily dropped into the drum body 10 thereby providing for safe transportation and storage and at the same time affording effective anchorage of the free end portion of the line 55 against unwinding when not in use.

Referring now to Figures 5 through 7, there is illustrated a preferred commercial form of the invention embodying structural details contributing to the simplification of manufacture and providing greater rigidity to the head wall adapting it to better resist the stresses of heavy loads applied to the line and to receive a rewind handle. This form of the invention also includes a novel line clip for securing the inner end of the line to the drum and a line guide for assuring proper rewinding of the line onto the drum periphery. Like the form of invention previously described, this embodiment consists generally of an open ended drum structure 10a rotatably supported with respect to a pair of handle spools 34a and 35a by a shaft 32a. Shaft 32a is preferably in the form of a standard headed cap or machine screw of approximately five and one-quarter inches in length. While drum 10a may be formed in any suitable manner, it preferably is fabricated from an annular wall section 14a made from a length of relatively thin sheet metal bent into annular configuration to bring its opposite ends into juxtaposed position. The opposite ends of the band 14a, as clearly shown in Figure 6, are bent upon themselves to form oppositely extending hook portions which, when intercoupled and crimped together as shown at 56 in Figure 6, secure the band ends against separation and lateral slippage with respect to one another. Also the edge of the stripping 14a, defining the open end of the drum, is preferably rolled to provide a reinforcing beading 57 to impart structural strength to the annular drum wall, produce a smooth non-cutting edge at the open end and an annular formation to prevent lateral slippage of the line from the edge.

The opposite end of the annular drum wall is telescoped upon an axially extending flange 58 formed on a head wall 16a. The free end of flange 57 is rolled backwardly around the end of strip 14a and clinched thereto to secure the annular drum wall to the head wall structure 16a. This construction results in a beading which, as in the previous form of the invention, cooperates with the beading 57 to retain line 55 against accidental displacement laterally of the drum periphery.

Flange 58 and the remainder of the head wall 16a reinforce the closed end of the annular wall 14a to impart extreme rigidity to the peripheral surface of the drum. As clearly shown in Figure 5, flange 58 of head wall 16a is carried by radially extending peripheral wall portion 60 which merges at its inner edge into an inwardly sloping wall portion 61 integrally connected to a radially extending wall portion 62 offset inwardly from wall portion 60. Wall portion 62 in turn joins an outwardly inclined wall portion 63 merging into a centrally disposed, disk-like panel portion 64 lying in a plane paralleling wall portions 60 and 62 and providing at its center with an opening 65 adapted to snugly but freely receive the threaded end 66 of support bolt or shaft 32a. It will be appreciated that the undulating formation of head wall 16a provides both axial and radial structural reinforcement to the head wall making it extremely rigid and capable of withstanding relatively heavy forces irrespective of the direction of application of the forces.

To further rigidify the head wall 16a in the area of the connection of the spindle or shaft 32a and at the same time provide a braking surface for cooperation with spool 34a, the present embodiment of the invention contemplates a sheet metal disk-like element 67 suitably apertured as indicated at 68 (Figure 8) to receive securing rivets 69 for attaching it to disk portion 64 of head wall 16a. Also as clearly seen in Figures 5 and 8, reinforcing and braking disk 67 is centrally apertured at 71 to freely but snugly receive threaded end 66 of shaft 32a. Also as will be clearly apparent from Figure 8, reinforcing and braking disk 67 at its central area is in the form of a circular panel 72 interrupted at diametrically opposed sides of opening 71 by punched out areas 73, the inwardly facing edges of which define axial planes parallel to the horizontal axis of the disk. The spacing between these inwardly facing edges is so chosen as to freely but closely receive therebetween the flat sides of a square nut 75 (Figure 5) threaded onto the end 66 of shaft 32a for a purpose to be hereinafter pointed out.

Disk 67 is inwardly depressed throughout an annular area 76, adjacent the periphery of panel 72 to form an annular rib the inner wall 77 of which provides a friction braking surface for cooperation with the rounded end 78 of spool 34a, the adjacent end of which is recessed at 79 to freely receive nut 75 in operation of the device. In assembling shaft 32a, the spool 35 having inset metal wear washers 81 in its opposite ends and the roller 34 having a wear washer 81 in its outermost end are first assembled on the shaft with spool 35a engaging head 82 of shaft 32a and a hooked arm 83 of brake operating lever 46a lying between the adjacent ends of the rollers 34a and 35a and supported on shaft 32a as clearly shown in Figure 7. In order that the hook portion 83 of lever 46a will be positively retained in place the end of spool 34a adjacent spool 35a is provided with a pair of angularly and radially off-set pins 84 adapted to abuttingly engage the opposite sides of portion 83 of arm 46a at axially spaced points so as to cooperate with the shaft 32a in holding brake operating arm 46a against accidental displacement. Roller 34a is also provided diametrically opposite pins 84 with a guide pin 85 for guiding the spools 34a and 35a in their relative axial movement. As clearly seen in Figure 5, the protruding ends of pins 84 and 85 are freely slidably received in suitable bores 86 formed in the adjacent end face of roller 35a. Hooked end 87 of arm 83 normally lies in a plane generally transversely related to the axis of shaft 32a and spools 34a and 35a so that upon movement of the free end of operating arm 46a transversely of shaft 32a the opposite ends of hooked end 87 will respectively engage wear washers 81 in the opposed ends of spools 34a and 35a to separate the spools forcing spool 34a to the left as shown in Figure 5 to engage its rounded end 78 with friction surface 77 of disk 67. Thus the braking effect in this form of the invention is a positive braking effect dependent upon the pressure applied to the operating handle end of the brake operating arm 46a.

The shaft and its relatively rotatable spools are secured to the drum by clamping the marginal portion of the disk-like panel 64 of head wall 16a and the marginal portion of the disk-like panel 72 of disk 67 defining the openings 65 and 71 between square nut 75 and a hexagonal clamp nut 88 threaded on the outermost end of the shaft 32a. It will be appreciated that by proper adjustment nut 75 along shaft 32a the axial spacing between the end of roller 34a and braking surface 77 can be varied to compensate for wear in use and to properly predetermine the braking movement required of spool 34a.

Referring further to Figure 5, it will be noted that wall section 62 of head wall 16a is provided at 91 with an aperture adapted to freely receive the threaded end of a cap screw 92 which rotatably supports a suitable handle 93 provided for rewinding the line upon the drum. As most clearly shown in Figure 5, this handle shaft 92 is clamped to end wall section 62 in the same manner as shaft 32a by means of squared nut 94 and clamp nut 95. It thus will be apparent that the handle portion 93 can be suitably adjusted with respect to the head of cap screw 92 to assure free turning of the handle for easy manipulation in rewinding the line.

As further clearly shown in Figure 5, the inner end of spool 34a adjacent the braking rim is provided with two radially directed pins 96. These pins 96 are provided for the mounting of a simple but effective line guide 98 composed of a relatively stiff piece of wire secured at one end to spool 34a and bent at its other end to provide an open loop 99 overlying the peripheral annular wall 14a of drum 10a. As more clearly shown in Figure 7, line guide 98 adjacent its one end is bent into a ring shape as shown at 101 to encircle spool 34a between the braking formation 78 at the inner end and the pins 96 while the extreme inner end is bent backwardly upon itself as indicated at 102 to encompass the radially extending portion 103 of line guide 98 and the pin 96 located on the side of spool 34a opposite that along which braking arm 46a extends. The intermediate portion 103 of line guide 98 is axially sloped as seen in Figure 5 to extend outwardly from the open end of the drum in position to be bent around the edge of the open end of drum 10a to form a portion 104 extending cross-wise of drum 10a in radially spaced relation to wall 14a. The wire is then bent in the opposite direction generally parallel to the periphery of the drum to form a portion 105 cooperating with portion 104 to provide an open ended loop overlying the drum periphery. The extreme free end of the portion 105 is then bent at substantially a right angle to overlie the portion 104 as indicated at 106. As clearly seen in Figure 5, the free end of line 55 coiled upon the periphery of drum 10a is inserted between the arms 104 and 105 of the line guide between the bite end of the wire and the return bent terminus 106 so that in use the line will be guided onto the drum periphery well between its opposite edges. Also since the line guide 98 rotates with spool 34a it is self-adjusting with respect to the periphery of the reel so as to be in proper operating position no matter what peripheral portion of the reel may be presented to the incoming line.

Also by reference to Figure 5, it will be noted that the sheet metal peripheral strip 14a is provided with a pair of laterally aligned stamped out portions 107 and 108 adapted to receive a light piece of bent spring wire 109 forming an attachment clip for line 55. Wire 109, as clearly seen in Figure 9 of the drawing, has a straight portion 111 one end of which is bent upwardly as indicated at 112. The other end of portion 111 joins an upwardly and transversely inclined section 113 the upper end of which is angularly off-set to provide a portion 114 the end of which, in assembled relation of the clip 109, is disposed beneath the drum beading 57 to lock the line clip 109 in place on the drum periphery. These various bends in the wire are so related that the line clip when assembled will be under tension and thereby held against relative rotational and sliding movement with respect to the periphery of the drums so long as the free end of arm section 114 is locked under bead 57.

While any suitable material may be used for the production of the hand line drums of this invention, it is contemplated that the drums will be made of a suitable non-corrosive metal, such as aluminum or the like, so as to resist the effects of moisture and salt water and to adapt the drums for use in military survival kits used by the armed forces on land and sea. In addition to serving as an effective and handy reel for fishing, the hand line drums of this invention are also admirably adapted for use as a control device for manipulating and handling metallic or like survival kites provided in armed services survival kits to enable downed flyers and life raft and life boat survivors to be located by radar and visual flasher signals. Also the hand line drum of this invention, because of its low expense, may be readily available for use by children and others in flying and manipulating model airplanes, play kites and model boats as will be clearly apparent to one skilled in the art. Any other suitable high production method of forming drums 10 and 10a such as spinning procedures to form annular ribs in place of beads 57 and 59 and the strengthening ribs and angularly related head wall sections, may be used without departing from the spirit of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and changes which come within the meaning and range of equivalency of the claims are therefore intended to be embraced therein.

What is claimed and desired to be secured by United States Letters Patent is:

1. In a hand line carrier, a drum open at one end and closed by a head wall at its other end; an axle extending axially through said head wall and outwardly beyond the open end of the drum; a head on one end of said axle secured to the outer side of said head wall; a disk mounted on the other end of said axle; a two part handle independently rotatable on said axle between the head wall and said disk, said head wall having an annular inwardly projecting rib concentric with the adjacent end of the inner handle part and into which the said adjacent end is frictionally received; and an operating member within said drum and engaging with the two parts of said handle for controlling the rotation of the drum and axle with respect to the handle, said operating member having a portion interposed between the opposed ends of said two part handle.

2. A hand fishing line carrier comprising a drum having a circular side wall and a head wall enclosing one end, the other end of the drum being open, an elongated axle extending through the center of and secured at one end to said head wall, the axle extending axially through the drum and beyond the open end thereof, an annular rib extending inwardly from the head wall concentric with the axle, the rib having a sloping inner surface, a pair of spools in end opposed relation on and rotatable about the axle, the inner one of the spools being adapted to enter the annular rib and bear against said sloping inner surface, a friction disk upon the outer end of the axle and bearing against the outer end of the outer one of the spools, a brake element interposed between the opposed ends of the spools, and means for forcing the spools apart by said brake element.

3. The invention according to claim 2 wherein the brake element comprises an annular element encircling the axle between the spools and the last named means comprising a lever connected at one end to the annular brake element and extending forwardly along the outer surface of the said one spool.

4. A hand fishing line carrier comprising a drum having a circular side wall and a head wall closing one end, the other end of the drum being open; an elongated axle attached at one end to the drum head wall and extending axially therethrough through and beyond the open end; a handle enclosing and rotatable about the axle and comprising two spools in end opposed relation on the axle, the spools being movable on the axle relative to one another and to the said head wall; means for moving one spool into frictional end engagement with the drum head wall for checking rotation of the drum, the said circular side wall being designed to have a fishing line wound thereon and the said head wall having an annular inwardly projecting rib concentric with the inner end of said one spool and into which the said spool end is frictionally received, and said spool moving means being interposed between the opposed spool ends.

5. A hand line carrier comprising an open ended drum having a head wall opposite its open end; a support axle fixedly secured to said end wall at its center and extending axially through said drum toward and beyond the open end; an annular rib on said head wall and coaxially arranged with respect to said support shaft and providing a sloping surface projecting inwardly from said head wall; a handle mounted in surrounding relation to said shaft comprising a pair of spool-like members disposed in end to end relation along said shaft; means at the free end of said shaft for preventing axial displacement of said spools therefrom; and a control element having an actuator portion located between the opposed ends of said pair of spool-like elements in partially surrounding relation to said shaft and an operating arm disposed in spaced relation to the periphery of the inner one of said spool-like elements and extending toward the head wall; an abutment pin extending between the opposed ends of said spool-like members and engaging a portion of said actuator portion to form a fulcrum therefor whereby upon lateral pressure being applied to said operating arm said actuator portion will fulcrum around said abutment pin and move said inner spool axially toward said head wall into frictional engagement with said sloping surface to effect a braking action of said drum with respect to said handle.

6. The combination defined in claim 5 wherein the head wall radially outwardly from said shaft is provided with a handle member extending away from said head wall in a direction opposite from said shaft to provide a handle for reeling the hand line upon said drum.

7. The combination defined in claim 5 wherein the peripheral wall of said drum at laterally spaced aligned points is provided with struck out relative flat V-like portions and attachment means extending laterally of said annular wall beneath said struck out portions and having an upstanding angularly offset portion at one end the free end of which is adapted to be attached adjacent the open end of the annular wall to secure said attachment means in place and provide means for securing the terminal end of a hand line thereto.

8. A hand line carrier comprising drum means having a head wall and an annular wall for receiving a hand line in coiled relation thereon; shaft means secured to said head wall to form an axle therefor; a pair of axially spaced spools receiving said axle rotatably therein and adapted for relative axial movement with respect to said axle, the one spool nearest the head wall being provided with a pair of oppositely radially protruding pins; a stiff wire-like line guide having one end in the form of a circular ring encircling said one spool adjacent said pins and terminating in a loop bent around one of said pins to fixedly secure said line guide to said spool for rotation therewith, having a radially outwardly and axially inclined central portion extending from said ring portion toward and through the open end of said drum and around the open end of said drum and its other end in the form of a laterally elongated loop lying adjacent the annular wall of said drum and forming a loop for guiding the line onto the annular drum wall upon rotational movement of said drum to reel in said line.

9. In a drum type hand line carrier comprising a thin sheet metal drum having an end wall closing one end of the drum and an open end: a support shaft secured to said end wall and extending through said drum and beyond the open end; a hand grip structure for rotatably mounting said support shaft comprising a pair of spool-like elements having axially extending bores therein for receiving said shaft, the inner and outer ends of the spool adjacent the drum end wall having radially outwardly rounded end flanges thereon adapted respectively to form a frictional braking surface and a finger grip; a lever comprising a portion disposed between the adjacent ends of said spools and providing an actuating formation disposed transversely of said shaft and a right angularly bent arm portion extending generally axially alongside of said one spool toward the end wall to form an operating arm adapted to be engaged by a finger of the user and moved transversely of the axis of said shaft and spools thereby twisting said actuating portion and moving said spool adjacent the drum end wall axially toward the end wall to brakingly engage the spool end with the end wall.

10. The combination of claim 9 wherein the end wall is provided with a centered opening adapted to freely and snugly receive an end of said support shaft and a radially extending portion surrounding said centered opening; a reinforcing and braking disk having a peripheral flange adapted to abuttingly engage the inner face of said radially extending end wall portion and a radially inwardly disposed annular rib extending toward the open end of said drum and providing an inclined wall extending toward said end wall and terminating in a planar disk-like portion abuttingly engaging a marginal portion of said end wall surrounding said centered opening, said planar disk-like portion providing a second opening for snugly but freely receiving said support shaft and struck out tabs laterally spaced at either side of the axis of said aligned centered openings to provide nut holding protuberances; a flat sided nut threaded on said shaft and adapted to abut said disk-like portion and engage said protuberances; and a clamp nut threaded on the end of said shaft extending through said centered openings and adapted to abut said radially extending portion of said drum end wall adjacent said centered opening to thereby clamp said end wall and said reinforcing and braking disks against said flat sided nut and fixedly secure said drum, said reinforcing and braking disk and said shaft for unitary rotation.

References Cited in the file of this patent

UNITED STATES PATENTS

| | | |
|---|---|---|
| 520,189 | Roehm | May 22, 1894 |
| 1,455,343 | Leber | May 15, 1923 |
| 1,543,489 | Wilson | June 23, 1925 |
| 2,047,705 | Porter | July 14, 1936 |
| 2,479,946 | Lofgren | Aug. 23, 1949 |
| 2,505,151 | Schweitz | Apr. 25, 1950 |